US008483682B1

(12) United States Patent
Dreiling et al.

(10) Patent No.: US 8,483,682 B1
(45) Date of Patent: Jul. 9, 2013

(54) METHOD AND SYSTEM FOR ACQUIRING A WIRELESS COMMUNICATION CHANNEL IN A WIRELESS COMMUNICATION SYSTEM

(75) Inventors: Ryan P. Dreiling, Lenexa, KS (US);
Woo Jae Lee, Manhattan, KS (US);
Nicholas John Baustert, Jr., Shawnee, KS (US); Jeffrey Scott Ward, Kansas City, MO (US); Cesar Perez, Olathe, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 491 days.

(21) Appl. No.: 12/652,828

(22) Filed: Jan. 6, 2010

(51) Int. Cl.
*H04W 4/00* (2009.01)

(52) U.S. Cl.
USPC .......... 455/434; 455/426.1; 455/432.1; 455/436; 455/456.1; 370/328; 370/331; 370/338

(58) Field of Classification Search
USPC . 455/426.1, 432.1, 434, 436, 456.1; 370/328, 370/331, 338
See application file for complete search history.

(56) References Cited

U.S. PATENT DOCUMENTS

| | | | |
|---|---|---|---|
| 6,625,451 | B1 | 9/2003 | La Medica et al. |
| 7,260,394 | B2 | 8/2007 | Welnick et al. |
| 7,349,695 | B2 | 3/2008 | Oommen et al. |
| 7,593,730 | B2 | 9/2009 | Khandelwal et al. |
| 7,603,119 | B1 | 10/2009 | Durig et al. |
| 7,826,844 | B2 * | 11/2010 | Cooper ............... 455/435.3 |
| 8,064,925 | B1 * | 11/2011 | Sun et al. ............ 455/456.1 |

* cited by examiner

*Primary Examiner* — Amancio Gonzalez

(57) ABSTRACT

In various embodiments, systems and methods are provided for a wireless device to acquire a wireless channel in wireless communication system. In an embodiment, the wireless device obtains a first wireless communication channel to operate on a first wireless network from a first wireless channel table where the first wireless communication channel is associated with a geographic identifier. The wireless device saves the geographic identifier and obtains a second wireless communication channel to operate on a second wireless network from a second wireless channel table using the geographic identifier where the second wireless communication channel is associated with the geographic identifier.

20 Claims, 5 Drawing Sheets

METHOD AND SYSTEM FOR ACQUIRING A WIRELESS COMMUNICATION CHANNEL IN A WIRELESS COMMUNICATION SYSTEM

TECHNICAL BACKGROUND

Wireless communication is a growing means for accessing a network and provides certain advantages over wired communications for accessing networks. One of those advantages is a lower cost of infrastructure to provide access to many separate locations or addresses compared to wired communications. This is the so-called "last mile" problem. Another advantage is mobility. Wireless communication devices, such as cell phones, are not tied by wires to a fixed location. To use wireless communication to access a network, a customer needs to have at least one transceiver in active communication with another transceiver that is connected to the network.

Wireless devices now offer the capability to communicate with multiple networks using different wireless technologies. Wireless technologies that are utilized by network operators include code division multiple access (CDMA) 1xRTT, Global System for Mobile communications (GSM), Universal Mobile Telecommunications System (UMTS), High-Speed Packet Access (HSPA), Evolution-Data Optimized (EV-DO), EV-DO rev. A, Third Generation Partnership Project Long Term Evolution (3GPP LTE), General Packet Radio Services (GPRS), Worldwide Interoperability for Microwave Access (WiMAX) and the like. Network operators may offer multimode devices where the device has the ability to communicate using two or more of these technologies. As these devices move from network to network, they require efficient processes and systems to select and acquire the proper wireless links.

OVERVIEW

In various embodiments, systems and methods are provided for a wireless device to acquire a wireless channel in wireless communication system. In an embodiment, the wireless device obtains a first wireless communication channel to operate on a first wireless network from a first wireless channel table where the first wireless communication channel is associated with a geographic identifier. The wireless device saves the geographic identifier and obtains a second wireless communication channel to operate on a second wireless network from a second wireless channel table using the geographic identifier where the second wireless communication channel is associated with the geographic identifier.

DETAILED DESCRIPTION

In an embodiment, a wireless device acquires a communication channel utilizing a geographic identifier when moving from one wireless network to another wireless network.

FIGS. 1-5 and the following description depict specific embodiments in greater detail that teaches those skilled in the art how to make and use the best mode of the invention. For the purpose of teaching inventive principles, some conventional aspects have been simplified or omitted. Those skilled in the art will appreciate variations from these embodiments that fall within the scope of the invention. Those skilled in the art will appreciate that the features described below can be combined in various ways to form multiple embodiments of the invention. As a result, the invention is not limited to the specific embodiments described below, but only by the claims and their equivalents.

Figure 1:
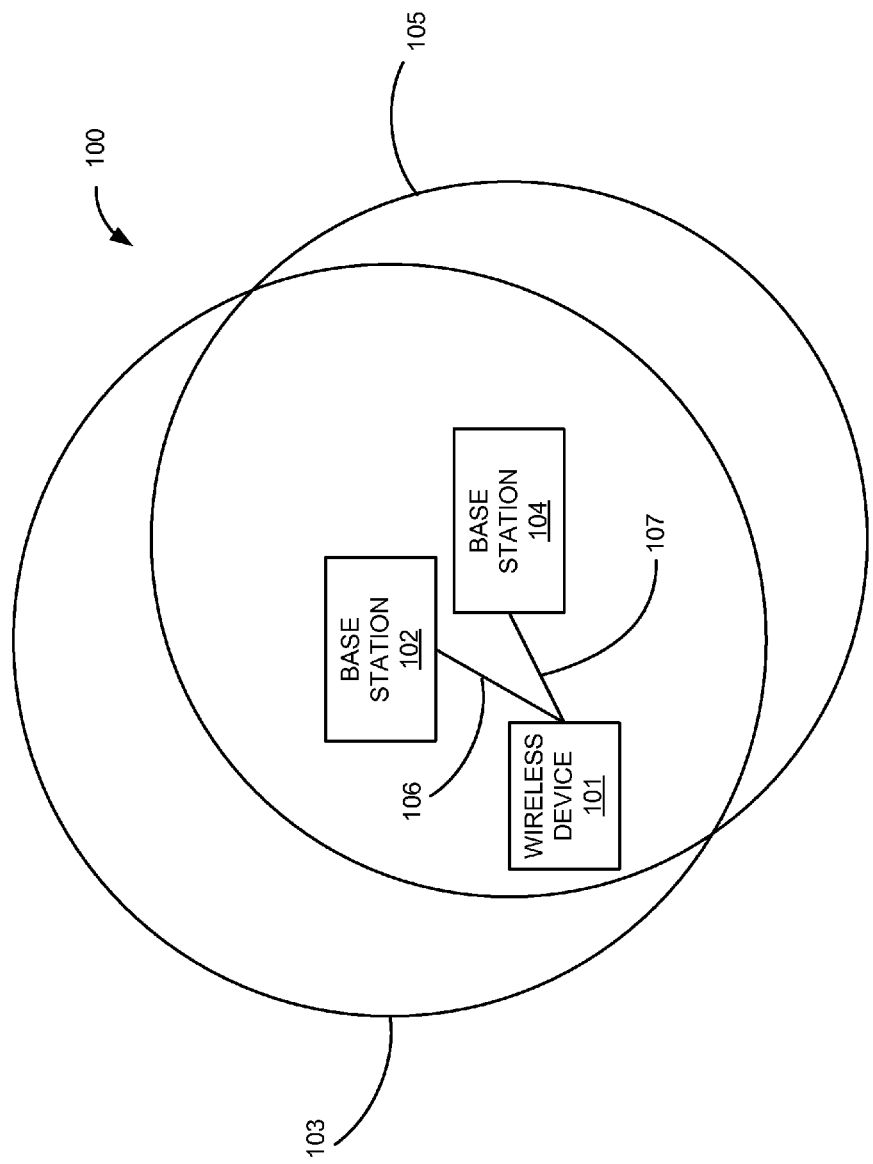
FIG. 1 is a block diagram illustrating a wireless communication system.

FIG. 1 is a block diagram illustrating wireless communication system 100. Wireless communication system comprises wireless device 101, base station 102, coverage area 103, base station 104, coverage area 105, wireless link 106, and wireless link 107. Wireless device 101 has the ability to exchange information wirelessly over wireless link 106 with base station 102 and over wireless link 107 with base station 104. Base station 102 has a corresponding coverage area 103 and base station 104 has a corresponding coverage area 105. Base stations 102 and 104 are further communicatively coupled to network elements (not shown) that allow wireless device 101 to communicate with other communication devices and systems.

Figure 2:
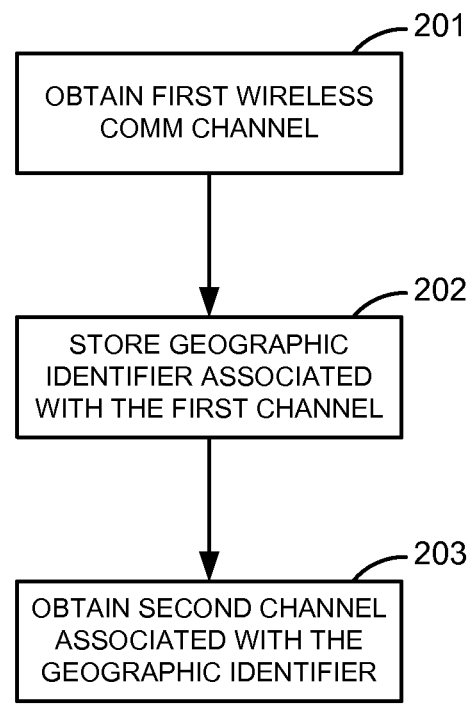
FIG. 2 is a flow diagram illustrating a method for acquiring a wireless communication channel.

FIG. 2 is a flow diagram illustrating a method of operating wireless communication system 100. Wireless device 101 obtains a first wireless communication channel to operate on a first wireless network from a first wireless channel table (201). In an embodiment, obtaining a first wireless communication channel comprises scanning the first wireless channel table for an appropriate frequency or slot so that wireless device 101 can begin to communicate with the first wireless network.

The first wireless communication channel is associated with a geographic identifier and is stored on the wireless device (202). In an example, wireless device 101 selects the first wireless communication channel from the first wireless channel table and stores the geographic identifier that is associated with the first wireless communication channel into the wireless device 101's memory for future reference.

Wireless device 101 obtains a second wireless communication channel to operate on a second wireless network from a second wireless channel table using the geographic identifier where the second wireless communication channel is associated with the geographic identifier (203). In one embodiment, obtaining a second wireless communication channel comprises scanning the second wireless channel table for the geographic identifier in the second wireless channel table and selecting the appropriate frequency or slot associated with the geographic identifier so that wireless device 101 can begin to communicate with the second wireless network. In another embodiment, obtaining a second wireless communication channel comprises scanning the second wireless channel table for the geographic identifier in the second wireless channel table, storing the set of channels associated with the geographic identifier and scanning the stored set of channels to select the appropriate frequency or slot so that wireless device 101 can begin to communicate with the second wireless network.

Figure 3:
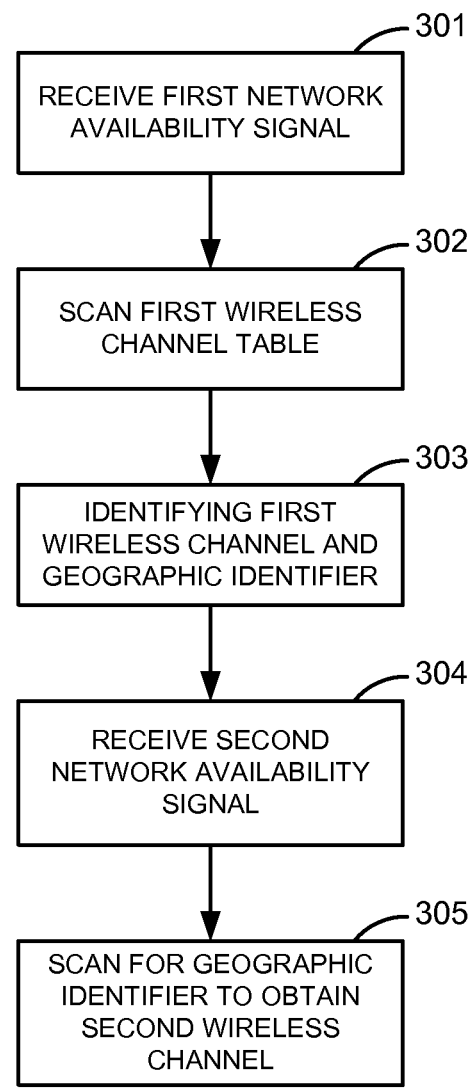
FIG. 3 is a flow diagram illustrating a method for acquiring a wireless communication channel.

FIG. 3 is a flow diagram illustrating another method for operating communication system 100. Wireless device 101 receives a network availability signal from a first wireless network (301) and scans for a first wireless channel in a first wireless channel table to operate on the first wireless network (302). The first wireless channel is associated with a geographic region identifier in the first wireless channel table.

Wireless device 101 begins operating on the first wireless network using the first wireless channel (303). Wireless device 101 receives a second network availability signal from a second wireless network (304) and scans for the geographic region identifier in a second wireless channel table to obtain a second wireless channel to operate on the second wireless network (305).

Network availability signals are any communication signals from a wireless network base station or access point that allows a wireless device to recognize the availability of the wireless network and gain access to it. In some embodiments, network availability signals may comprise communication over broadcast control channels, paging control channels and the like.

Referring back to FIG. 1, wireless communication device 101 comprises Radio Frequency (RF) communication circuitry and an antenna. The RF communication circuitry typically includes an amplifier, filter, modulator, and signal processing circuitry. Wireless communication device 101 may also include a user interface, memory device, software, processing circuitry, or some other communication components. Wireless communication device 101 may be a telephone, computer, e-book, mobile Internet appliance, wireless network interface card, media player, game console, or some other wireless communication apparatus—including combinations thereof.

Base stations 102 and 104 may be any wireless system that provides the air interface to wireless devices and communication connectivity to the communication network. Examples of base stations that may be utilized include base station transceivers (BTSs), base station controllers (BSCs), base station (BSs), radio base stations (RBSs), Node B, enhanced Node B (eNBs) and others. Base stations 102 and 104 may include a number of elements known to those skilled in the art comprising a transceiver, power amplifier, combiner, duplexer, antenna and control function. Further, base stations 102 and 104 may comprise one antenna or multiple antennas having corresponding sectors and frequency assignments. Base stations 102 and 104 may have several transceivers and corresponding antennas which allow it to serve several different frequencies and different sectors of the base station.

Wireless links 106 and 107 use the air or space as the transport media. Wireless links 106 and 107 may use various protocols, such as Code Division Multiple Access (CDMA), Evolution Data Only (EVDO), Worldwide Interoperability for Microwave Access (WIMAX), Global System for Mobile Communication (GSM), Long Term Evolution (LTE), Wireless Fidelity (WIFI), High Speed Packet Access (HSPA), or some other wireless communication format.

Figure 4:
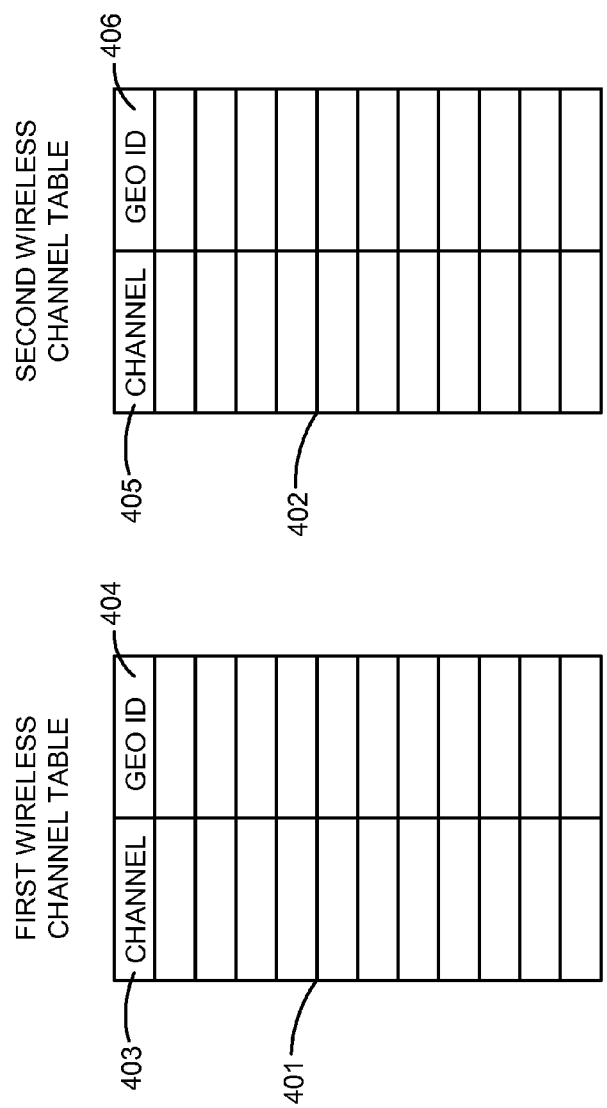
FIG. 4 is a block diagram illustrating wireless channel tables.

FIG. 4 illustrates channel tables that may be used when operating the methods described in FIGS. 2 and 3 on communication system 100. In an embodiment, first wireless channel table 401 and second wireless channel table 402 are utilized by wireless device 101 to select an appropriate system to operate on a wireless network and acquire a channel to operate on that wireless network. First channel wireless table 401 and second wireless channel table 402 are stored on wireless device 101. First wireless channel table 401 is associated with a first wireless network and second wireless channel table 402 is associated with a second wireless network. Additional channel tables may be stored on wireless device 101 depending upon the number of wireless networks wireless device 101 has the ability to access. Channel tables may also be stored on any other medium or location that will allow wireless device 101 access the channel tables.

First wireless channel table 401 comprises a column of channel fields 403 and a column of geographic identifier fields 404. Similarly, second wireless channel table 402 comprises a column of channel fields 405 and a column of geographic identifier fields 406. In an embodiment, the channel fields 403 and 405 are associated to one another by using common geographic identifiers 404 and 406. For example, one of channel fields 403 may contain a frequency block of available frequencies for a particular geographic area to operate on a first network. This geographic area is identified by a geographic identifier stored in the corresponding geographic identifier field. Similarly, one of channel fields 405 may contain a block of available frequency/time slots for a particular geographic region to operate on a second network. If the geographic areas identified in channel fields in wireless channel tables 401 and 402 are similar, they will be assigned the same geographic identifier that will be used to associate the channel fields in wireless channel tables 401 and 402.

In another embodiment, first and second wireless channel tables 401 and 402 may be preferred roaming lists (PRLs). For example, if first channel table 401 is a wireless channel table associated with CDMA technology, first wireless channel table 401 would be a CDMA PRL having a unique format associated with CDMA. If second wireless channel table 402 is a channel table associated with WiMAX, second wireless channel table 402 would be a WiMAX PRL having a unique format associated with WiMAX.

As would be known to one skilled in the art, a PRL is a table or set of tables that allow a wireless device to select a wireless network and acquire the appropriate channel to operate on that wireless network. PRLs are typically stored on the wireless device. In a CDMA network, PRLs typically comprise two functional tables: an acquisition table and a system table. An acquisition table includes an indexed list of channels or frequencies that the wireless device may use to gain access to particular wireless networks. The information contained in each acquisition table entry comprises an index, the network type, and associated channel blocks. The system table comprises a prioritized list of systems that the wireless device may access. Each system table includes system ids (SIDs) and network ids (NIDs). SIDs identify a geographic region, such as the area of a city or large town. NIDs are an optional subdivision of a SID.

When a wireless device has the ability to operate on multiple wireless networks, each network has an independent channel table to allow wireless device 101 to access a particular wireless network. In an example, assume first wireless channel table 401 is associated with CDMA and second wireless channel table 402 is associated with WiMAX. Each channel table has unique SID/NID combinations. In an embodiment, first wireless channel table 401 associates the SID/NID with a geographic identifier. The geographic identifier may be any code or name that is correlated to the SID/NID. Second wireless channel table 402 uses the same geographic identifier as used in first wireless channel table 401 for similar geographic areas. When wireless device 101 switches from CDMA to WiMAX, wireless device 101 scans second wireless channel table 402 for the geographic identifier that is associated with the appropriate channel or set of channels to operate on the WiMAX network. If more than one channel is associated with a geographic identifier, wireless device 101 may scan only those channels that are associated with that geographic identifier, thereby efficiently obtaining the wireless channel.

A channel as used in describing FIGS. 2, 3 and 4 may be any wireless link that allows communication between wireless device 101 and base stations 102 and 104. Examples include frequency allocations, time allocation and combinations of the frequency and time slots that may be used in orthogonal frequency division multiplexing (OFDM) based technologies.

When performing the methods illustrated in FIGS. 2 and 3, wireless device 101 may desire to change wireless technologies for a variety of reasons. For example, when wireless device 101 moves from one geographic area to another, it may enter into a stronger coverage area that is better suited for accessing an alternative wireless network. Thus, wireless device would then begin the transition from its current wireless network to another network that would provide a better wireless link.

Additionally, increased or decreased reception quality from one wireless network to another network would also be a situation where wireless device 101 may switch to another wireless network. Referring to FIG. 1, should wireless device 101 be in coverage area 103 that initially has better wireless link qualities than coverage area 105, wireless device would use the wireless network associated with base station 102. Should the wireless link conditions change such that coverage area 105 becomes a preferred coverage area, then wireless device could switch from the network associated with base station 102 to the wireless network associated with base station 104.

Figure 5:
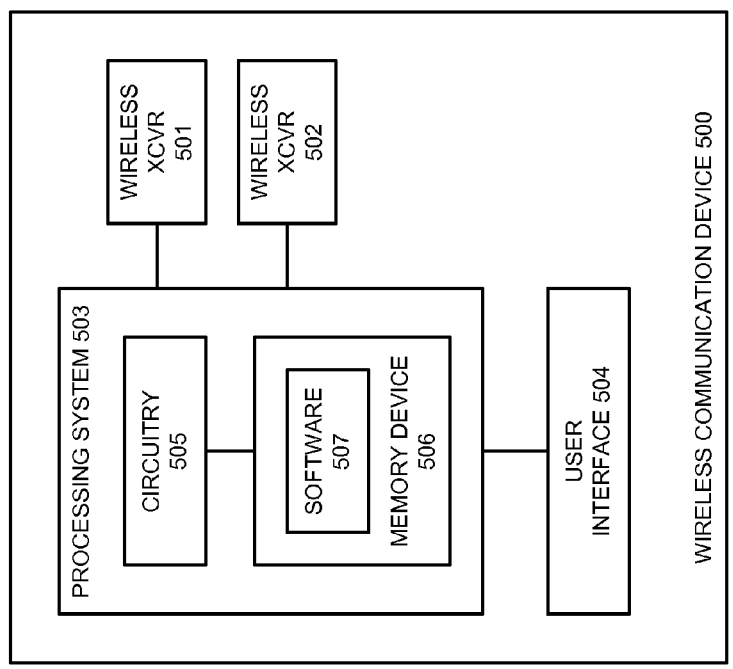
FIG. 5 is a block diagram illustrating a wireless communication device.

FIG. 5 is a block diagram illustrating wireless communication device 500. Wireless communication device 500 is an example of wireless device 101 although device 101 may use alternative configurations. Wireless communication device 500 comprises wireless transceiver 501, wireless transceiver 502, processing system 503, and user interface 504. Processing system 503 comprises processing circuitry 505 and memory device 506 that stores operating software 508. Processing system 503 is linked to wireless transceiver 501, wireless transceiver 502, and user interface 504. Wireless communication device 500 may include other well-known components that are not shown for clarity, such as a battery, camera, and enclosure.

Wireless transceivers 501 and 502 comprise an antenna, RF transceiver, signal processing circuitry, software, and/or some other wireless communication components. Wireless transceivers 501 and 502 may use various protocols, such as Code Division Multiple Access (CDMA), Evolution Data Only (EVDO), Worldwide Interoperability for Microwave Access (WIMAX), Global System for Mobile Communication (GSM), Long Term Evolution (LTE), Wireless Fidelity (WIFI), High Speed Packet Access (HSPA), or some other wireless communication format—including combinations thereof. Wireless transceivers 501 and 502 exchanges media, such as voice and video, with their respective communication networks. In some examples, wireless transceivers 501 and 502 transmit and receive network data such as signaling and data traffic to their communication networks.

User interface 504 comprises components that interact with a user. User interface 504 may include buttons, lights, display, touch screen, or some other user input/output apparatus—including combinations thereof.

Processing circuitry 505 comprises microprocessor and other circuitry that retrieves and executes operating software 507 from memory device 506. Memory device 506 comprises a computer-readable storage medium, such as a disk drive, flash drive, data storage circuitry, or some other memory apparatus. Memory device 506 may also store first wireless channel table 401 and second wireless channel table 402 that are accessed by processing circuitry 505. Processing circuitry 505 is typically mounted on a circuit board that may also hold memory device 506 and portions of user interface 504 and wireless transceivers 501 and 502.

Operating software 507 comprises computer programs, firmware, or some other form of computer-readable processing instructions. Operating software 507 may include an operating system, utilities, drivers, network interfaces, applications, or some other type of software. When executed by processing circuitry 505, operating software 507 directs processing system 503 to operate wireless communication device 500 as described herein for wireless device 101. In some examples, operating software 507 directs processing system 503 to scan for a first wireless channel in a first wireless channel table to operate on the first wireless network where the first wireless channel is associated with a geographic region identifier. Processing system identifies the first wireless channel and geographic region identifier and scans for the geographic region identifier in a second wireless channel table to obtain a second wireless channel to operate on the second wireless network.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of acquiring a communication channel in a wireless device comprising:
    obtaining a first wireless communication channel to operate on a first wireless network from a first wireless channel table, wherein the first wireless communication channel is associated with a geographic identifier;
    saving the geographic identifier; and
    obtaining a second wireless communication channel to operate on a second wireless network from a second wireless channel table using the geographic identifier, wherein the second wireless communication channel is associated with the geographic identifier.

2. The method of claim 1 wherein obtaining the second wireless communication channel comprises scanning the second wireless channel table for the geographic identifier.

3. The method of claim 1 wherein obtaining the second wireless communication channel comprises:
    scanning the second wireless channel table for channels associated with the geographic identifier; and
    scanning the channels associated with the geographic identifier to obtain the second wireless communication channel.

4. The method of claim 1 wherein obtaining the second wireless communication channel comprises scanning a system table for a geographic identifier.

5. The method of claim 1 wherein the geographic identifier comprises the system identifier associated with the first wireless communication channel.

6. The method of claim 5 wherein the first wireless channel table and the second wireless channel table include the system identifier.

7. The method of claim 6 wherein the system identifier is associated with a geographic region.

8. The method of claim 1 wherein the first wireless channel table is a preferred roaming list (PRL).

9. The method of claim 1 wherein the first wireless network is a code-division multiple access (CDMA) network.

10. The method of claim 1 wherein the second wireless network is a WiMAX network.

11. The method of claim 1 further comprising determining the availability of the first wireless network.

12. A method of acquiring a channel in a wireless communication system comprising:
receiving a network availability signal from a first wireless network;
scanning for a first wireless channel in a first wireless channel table to operate on the first wireless network, wherein the first wireless channel is associated with a geographic region identifier;
identifying the first wireless channel and geographic region identifier;
receiving a second network availability signal from a second wireless network; and
scanning for the geographic region identifier in a second wireless channel table to obtain a second wireless channel to operate on the second wireless network.

13. The method of claim 12 further comprising when the geographic region identifier is associated with more than one channel, scanning for the second wireless communication channel by scanning only channels associated with the geographic identifier.

14. The method of claim 12 wherein the geographic region identifier comprises the system identifier associated with the first wireless communication channel.

15. The method of claim 14 wherein the first wireless channel table and the second wireless channel table include the system identifier.

16. The method of claim 15 wherein the system identifier is associated with a geographic region.

17. The method of claim 12 wherein the first wireless channel table is a preferred roaming list (PRL).

18. A wireless communication device comprising:
a first communication interface configured to receive a network availability signal from a first wireless network;
a second communication interface configured to receive a network availability signal from a second wireless network; and
a processing system coupled to the first communication interface configured to:
scan for a first wireless channel in a first wireless channel table to operate on the first wireless network, wherein the first wireless channel is associated with a geographic region identifier;
identify the first wireless channel and geographic region identifier; and
scan for the geographic region identifier in a second wireless channel table to obtain a second wireless channel to operate on the second wireless network.

19. The wireless communication device of claim 18 wherein the processing system is further configured to scan for the second wireless communication channel by scanning only channels associated with the geographic identifier when the geographic region identifier is associated with more than one channel.

20. The wireless communication device of claim 18 wherein the geographic region identifier comprises the system identifier associated with the first wireless communication channel.

* * * * *